US010290197B2

(12) United States Patent
Chandraker et al.

(10) Patent No.: US 10,290,197 B2
(45) Date of Patent: *May 14, 2019

(54) MASS TRANSIT SURVEILLANCE CAMERA SYSTEM

(71) Applicants: NEC Laboratories America, Inc., Princeton, NJ (US); NEC Hong Kong Limited, Hunghom, Kowloon (HK)

(72) Inventors: Manmohan Chandraker, Santa Clara, CA (US); Wongun Choi, Lexington, MA (US); Eric Lau, Kowloon (HK); Elsa Wong, Kowloon (HK); Guobin Chen, San Jose, CA (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,533

(22) Filed: Jun. 29, 2017

(65) Prior Publication Data

US 2018/0046646 A1 Feb. 15, 2018

Related U.S. Application Data

(60) Provisional application No. 62/374,981, filed on Aug. 15, 2017.

(51) Int. Cl.
*G08B 21/02* (2006.01)
*G06N 20/00* (2019.01)
(Continued)

(52) U.S. Cl.
CPC ..... *G08B 21/0205* (2013.01); *G06F 16/5838* (2019.01); *G06F 16/5854* (2019.01);
(Continued)

(58) Field of Classification Search
CPC ............ G08B 21/0205; G08B 21/0222; G08B 21/0208; G08B 21/0461; G08B 21/24;
(Continued)

(56) References Cited

U.S. PATENT DOCUMENTS 9,905,104 B1\* 2/2018 Chandraker ....... G08B 21/0205
2011/0084807 A1\* 4/2011 Logan ..................... H04Q 9/00
340/10.1
(Continued)

OTHER PUBLICATIONS

Girshick, Ross. "Fast r-cnn." Proceedings of the IEEE International Conference on Computer Vision. Dec. 2015, pp. 1440-1448.
(Continued)

*Primary Examiner* — Carol Wang
(74) *Attorney, Agent, or Firm* — Joseph Kolodka (57) ABSTRACT

A mass transit surveillance system and corresponding method are provided. The mass transit surveillance system includes a camera configured to capture an input image of a subject purported to be a baby and presented at a mass transit environment. The mass transit surveillance system further includes a memory storing a deep learning model configured to perform a baby detection task for the mass transit environment. The mass transit surveillance system also includes a processor configured to apply the deep learning model to the input image to provide a baby detection result of either a presence or an absence of an actual baby in relation to the subject purported to be the baby. The baby detection task is configured to evaluate one or more different distractor modalities corresponding to one or more different physical spoofing materials to prevent baby spoofing for the baby detection task.

20 Claims, 9 Drawing Sheets (51) Int. Cl.
*G06F 16/583* (2019.01)
*G06F 17/30* (2006.01)
*G06K 9/00* (2006.01)
*G06N 99/00* (2019.01)
*G08B 21/04* (2006.01)
*G08B 21/24* (2006.01)

(52) U.S. Cl.
CPC .. *G06F 17/30256* (2013.01); *G06F 17/30259* (2013.01); *G06K 9/00067* (2013.01); *G06N 20/00* (2019.01); *G06N 99/005* (2013.01); *G08B 21/0208* (2013.01); *G08B 21/0222* (2013.01); *G08B 21/0461* (2013.01); *G08B 21/24* (2013.01)

(58) Field of Classification Search
CPC ........ G06F 17/30259; G06F 17/30256; G06N 99/005; G06K 9/00067
See application file for complete search history.

(56) References Cited

U.S. PATENT DOCUMENTS

| | | | |
|---|---|---|---|
| 2014/0016837 A1* | 1/2014 | Nechyba | G06K 9/00228 382/118 |
| 2016/0371555 A1* | 12/2016 | Derakhshani | G01S 7/539 |
| 2018/0046646 A1* | 2/2018 | Chandraker | G08B 21/0205 |

OTHER PUBLICATIONS

Yang, et al., "Exploit All the Layers: Fast and Accurate CNN Object Detector with Scale Dependent Pooling and Cascaded Rejection Classifiers", Proceedings of the IEEE Conference on Computer Vision and Pattern Recognition. Jun. 2016, 9 pages.

Denton, et al., "Exploiting Linear Structure Within Convolutional Networks for Efficient Evaluation", Advances in Neural Information Processing Systems, Dec. 2014, pp. 1269-1277.

Hinton, et al., Distilling the Knowledge in a Neural Network,: arXiv preprint arXiv:1503.02531, Mar. 2015, pp. 1-9.

* cited by examiner

MASS TRANSIT SURVEILLANCE CAMERA SYSTEM

RELATED APPLICATION INFORMATION

This application claims priority to provisional application Ser. No. 62/374,981 filed on Aug. 15, 2016, incorporated herein by reference. This application is related to an application entitled "Baby Detection for Electronic-Gate Environments", and which is incorporated by reference herein in its entirety. This application is related to an application entitled "Smuggling Detection System", having 15/637,433, and which is incorporated by reference herein in its entirety.

BACKGROUND

Technical Field

The present invention relates to security and more particularly to baby detection for electronic-gate (e-gate) environments.

Description of the Related Art

Baby detection is task that can be useful in a variety of applications. Previous methods for baby detection have mostly relied on laser-based sensors that identify the presence of a person in an electronic-gate (e-gate) system by detecting legs. Such methods are not applicable to identifying any person that is not standing on the ground such as, for example, babies that are often carried by an adult on their arms thus suspending the baby's feet in the air and thwarting such laser-based sensors. Thus, there is a need for an improvement to current baby detection systems.

SUMMARY

According to an aspect of the present invention, a mass transit surveillance system is provided. The mass transit surveillance system includes a camera configured to capture an input image of a subject purported to be a baby and presented at a mass transit environment. The mass transit surveillance system further includes a memory storing a deep learning model configured to perform a baby detection task for the mass transit environment. The mass transit surveillance system also includes a processor configured to apply the deep learning model to the input image to provide a baby detection result of either a presence or an absence of an actual baby in relation to the subject purported to be the baby. The baby detection task is configured to evaluate one or more different distractor modalities corresponding to one or more different physical spoofing materials to prevent baby spoofing for the baby detection task.

According to another aspect of the present invention, a computer-implemented method is provided for mass transit surveillance. The method includes capturing, by a camera, an input image of a subject purported to be a baby and presented at a mass transit environment. The method further includes storing, in a memory, a deep learning model configured to perform a baby detection task for the mass transit environment. The method also includes applying, by a processor, the deep learning model to the input image to provide a baby detection result of either a presence or an absence of an actual baby in relation to the subject purported to be the baby. The baby detection task is configured to evaluate one or more different distractor modalities corresponding to one or more different physical spoofing materials to prevent baby spoofing for the baby detection task.

According to yet another aspect of the present invention, a computer program product is provided for mass transit surveillance. The computer program product includes a non-transitory computer readable storage medium having program instructions embodied therewith. The program instructions are executable by a computer to cause the computer to perform a method. The method includes capturing, by a camera, an input image of a subject purported to be a baby and presented at a mass transit environment. The method further includes storing, in a memory, a deep learning model configured to perform a baby detection task for the mass transit environment. The method also includes applying, by a processor, the deep learning model to the input image to provide a baby detection result of either a presence or an absence of an actual baby in relation to the subject purported to be the baby. The baby detection task is configured to evaluate one or more different distractor modalities corresponding to one or more different physical spoofing materials to prevent baby spoofing for the baby detection task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to baby detection for electronic-gate (e-gate) environments.

In an embodiment, an image-based baby-head detection method is provided that can robustly identify the presence of a baby as long as the baby is visible to a camera.

In an embodiment, the present invention automatically identifies the presence of a baby in a live stream video for an automated electronic-gate (e-gate) system such as can be found at a location of immigration. In an e-gate application, a person might appear together with a baby who requires a manual identification process. Automatically identifying the presence of a baby is critical in such an application in order to achieve a high throughput as well as a high security. The baby may appear in various different configurations and/or postures in a video. The identification system needs to be run at high frequency in order to meet the real-time requirement.

In an embodiment, the present invention performs baby detection by applying a highly accurate and efficient image-based baby head detection method. The method identifies the presence of a baby by detecting the baby's head in images recorded by one or more cameras. In an embodiment, the method can use a deep neural network based detection algorithm for high reliability. In an embodiment, the present invention can provide a recognition result in real-time.

Figure 1:
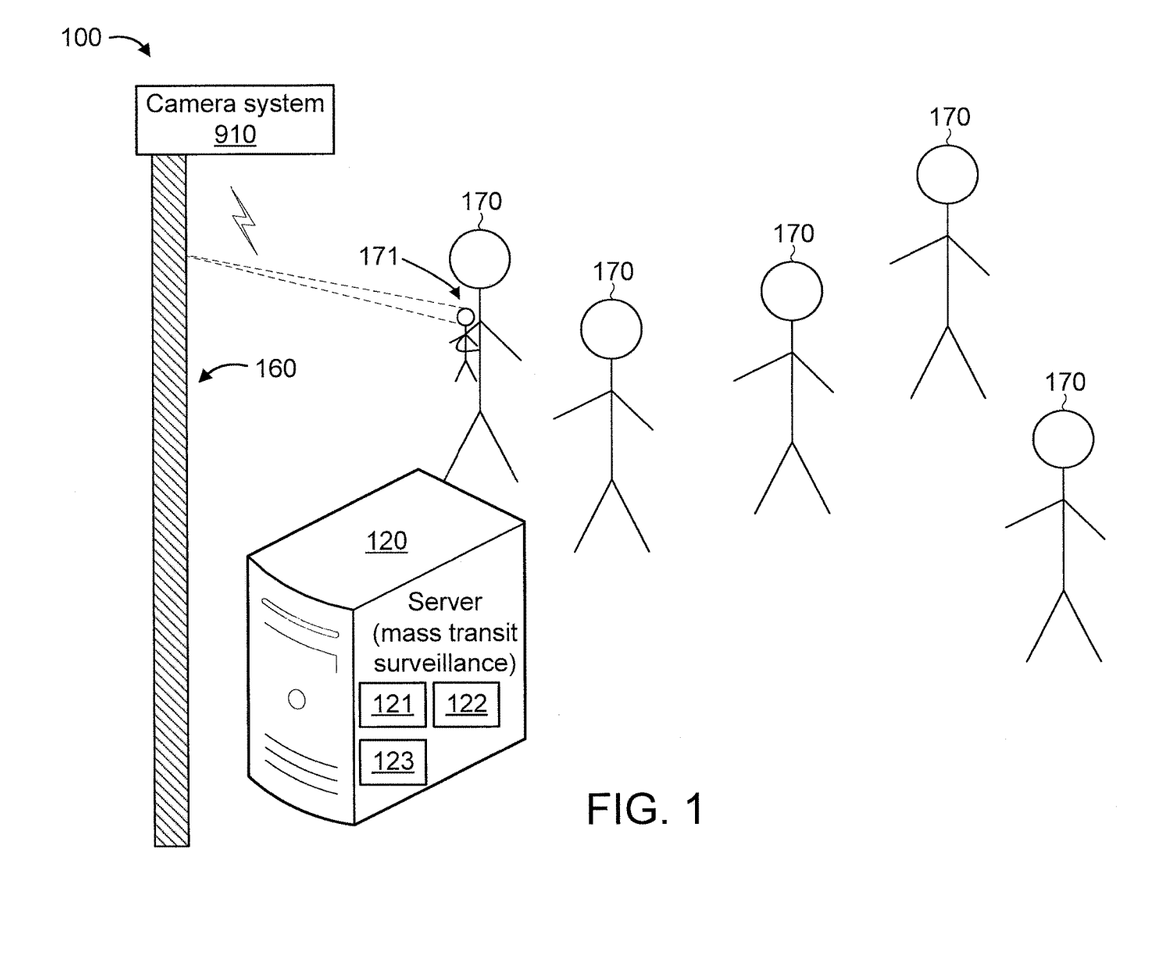
FIG. 1 shows an exemplary system for mass transit surveillance, in accordance with an embodiment of the present invention.

FIG. 1 shows an exemplary system 100 for mass transit surveillance, in accordance with an embodiment of the present invention.

The system 100 includes a camera system 110. While a single camera system 110 is shown in FIG. 1 for the sakes of illustration and brevity, it is to be appreciated that multiple camera systems can be also used, while maintaining the spirit of the present invention.

In the embodiment of FIG. 1, the camera system 110 is mounted on a mounting entity 160. For the sake of illustration, the mounting entity 160 is a pole 180. While a pole 160 is shown for the sake of illustration, any other mounting entity can be used, as readily appreciated by one of ordinary skill in the art given the teachings of the present invention provided herein, while maintaining the spirit of the present invention. For example, the camera system 110 can be mounted on a building, and so forth. The preceding examples are merely illustrative. It is to be appreciated that multiple mounting entities can be located at control hubs and sent to a particular location as needed.

The camera system 110 can be a wireless camera system or can use one or more antennas included on the pole 160 (or other mounting entity (e.g., building, drone, etc.) to which the camera system 110 is mounted or proximate).

The system 100 further includes a server 120 for mass surveillance detection that involves detecting the presence of a "fake" baby (which can potentially represent a dangerous condition such as, but not limited to, someone having a dangerous or prohibited object (explosives, drugs, etc.) on their person). The server 120 can located remote from, or proximate to, the camera system 110. The server 120 includes a processor 121, a memory 122, and a wireless transceiver 123. The processor 121 and the memory 122 of the remove server 120 are configured to perform mass surveillance detection based on images received from the camera system 110 by the (the wireless transceiver 123 of) the remote server 120. To that end, the processor 121 and memory 122 can be configured to include components of an image-based baby detection system. In this way, the presence of a baby 171, carried by a person 170, can be recognized as well as the presence of a non-baby being presented as a baby for an undesirable and/or potentially dangerous purpose.

Accordingly, some exemplary suitable environments to which the present invention can be applied can include any environments where mass transit surveillance can prove useful such as border crossings, subways, transportation hubs, airports, ship ports, and so forth. It is to be appreciated that the preceding environments are merely illustrative and, thus, other environments can also be used, while maintaining the spirit of the present invention.

Figure 2:
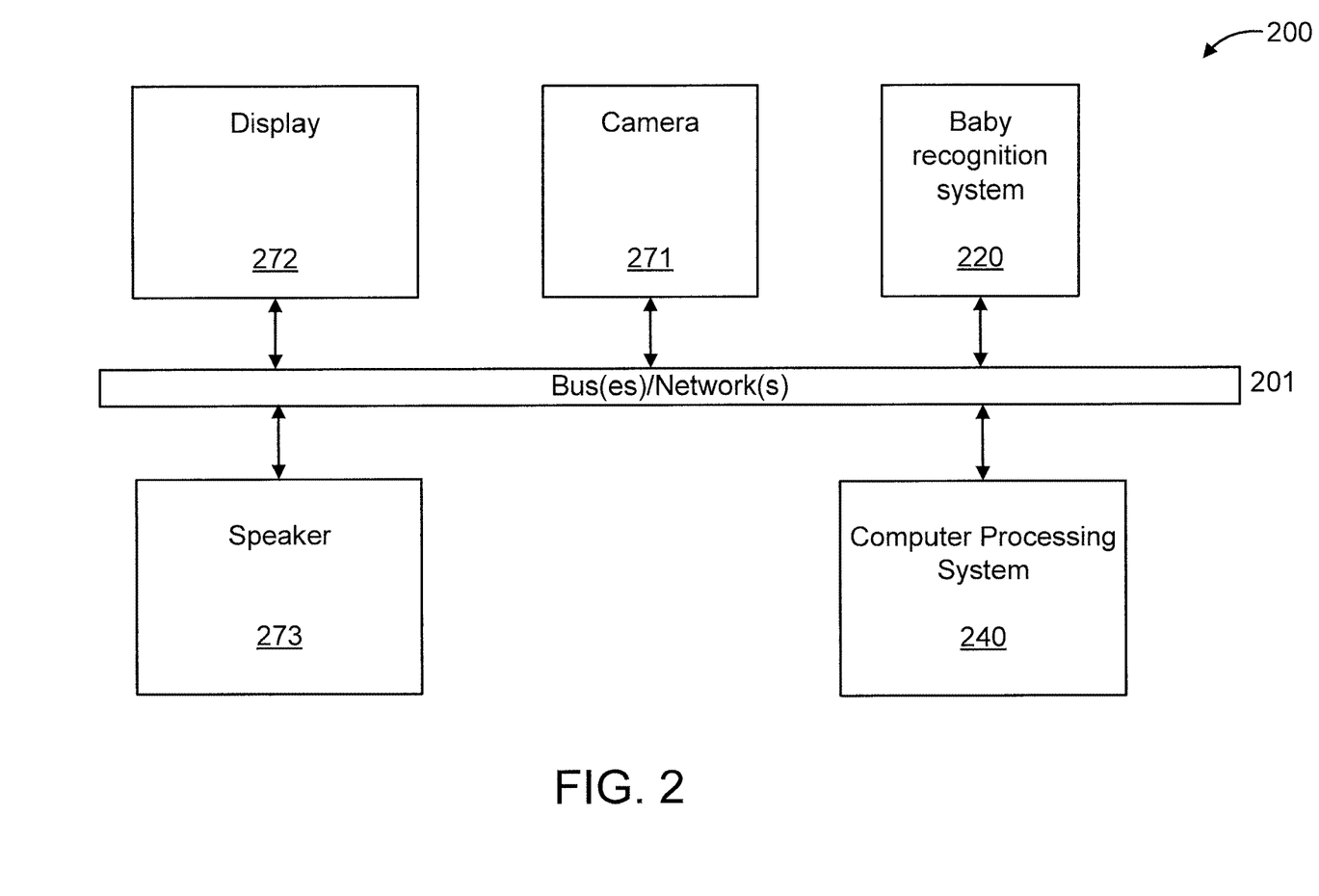
FIG. 2 shows another exemplary system for baby detection, in accordance with an embodiment of the present principles.

FIG. 2 shows another exemplary system 200 for baby detection, in accordance with an embodiment of the present principles. System 200 can represent an implementation of system 100, in accordance with an embodiment of the present invention.

The system 200 includes a baby detection system 220 and a computer processing system 240.

The computer processing system 240 essentially controls the other systems of system 200, including the baby detection system 220.

The baby detection system 220 recognizes babies from images and/or video.

The computer processing system 240 performs functions relating, for example, but not limited to: (i) processing baby detection results; (ii) performing one or more actions based on the baby detection results.

The baby detection system 220 and/or the computer processing system 240 can include a camera. For the sake of illustration, a separate camera 271 is shown. The camera 271 can capture images/video of the user. The images/video can then be processed by the computer processing system 240 and/or any of the systems under its control. In an embodiment, the camera 271 can be capable of capturing still and moving images. In an embodiment, the camera can acquire images in the visible and/or infra-red spectrum.

The baby detection system 220 and/or the computer processing system 240 can include a display. For the sake of illustration, a separate display 272 is shown. The display 272 can show baby detection information to the user or other personnel (e.g., security personnel).

The baby detection system 220 and/or the computer processing system 240 can include a speaker. For the sake of illustration, a separate speaker 273 is shown. The speaker 273 can provide auditory guidance to the user (e.g., regarding face positioning, and so forth) and/or a local alert that someone is attempting to spoof the system in order to draw attention to that person.

In an embodiment, one or more of the elements of system 200 is implemented in the cloud using a cloud-based configuration.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based.

Further, while one or more elements may be shown as separate elements, in other embodiments, these elements can be combined as one element. For example, while the camera 211 is shown as a separate entity from the baby detection system 220 and the computing processing system 240, in other embodiments the baby detection system 230 and/or the computing processing system 240 can include the camera, obviating the need for a separate camera. Also for example, while the baby detection system 220 and the computer processing system 240 are shown as separate entities, in other embodiments, the baby detection system 220 can be included in the computer processing system 240. The converse is also applicable, where while one or more elements may be part of another element, in other embodiments, the one or more elements may be implemented as standalone elements.

Moreover, one or more elements of FIG. 2 can be implemented in a cloud configuration including, for example, in a distributed configuration.

Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth.

These and other variations of the elements of system 200 are readily determined by one of ordinary skill in the art, given the teachings of the present principles provided herein, while maintaining the spirit of the present principles.

Figure 3:
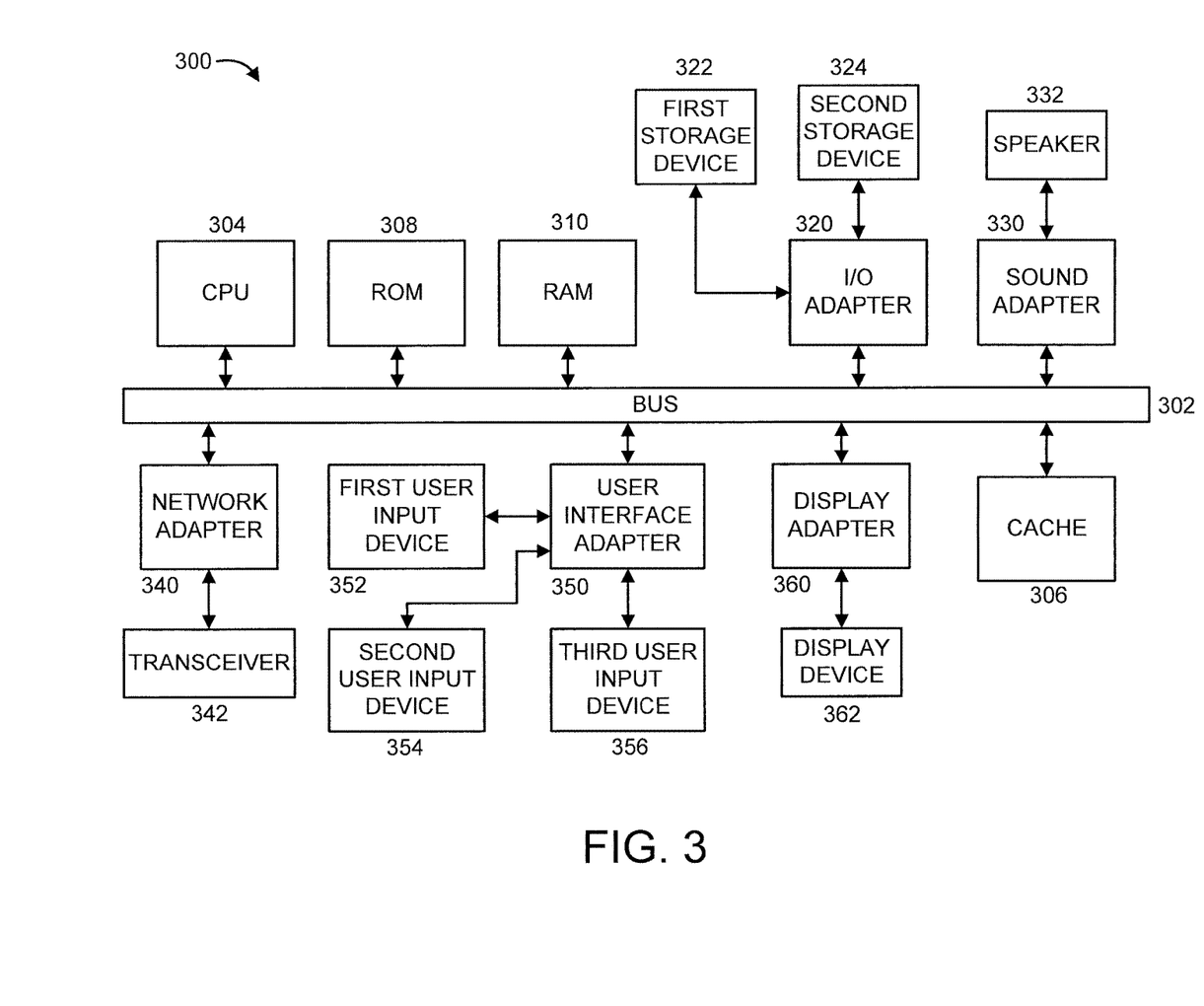
FIG. 3 shows an exemplary processing system to which the invention principles may be applied, in accordance with an embodiment of the present invention.

FIG. 3 shows an exemplary processing system 300 to which the invention principles may be applied, in accordance with an embodiment of the present invention. The processing system 300 can be used, for example, to implement the server 120 of FIG. 1, the overall system 200 or the computer processing system 240 of FIG. 2.

The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present invention provided herein.

Figure 4:
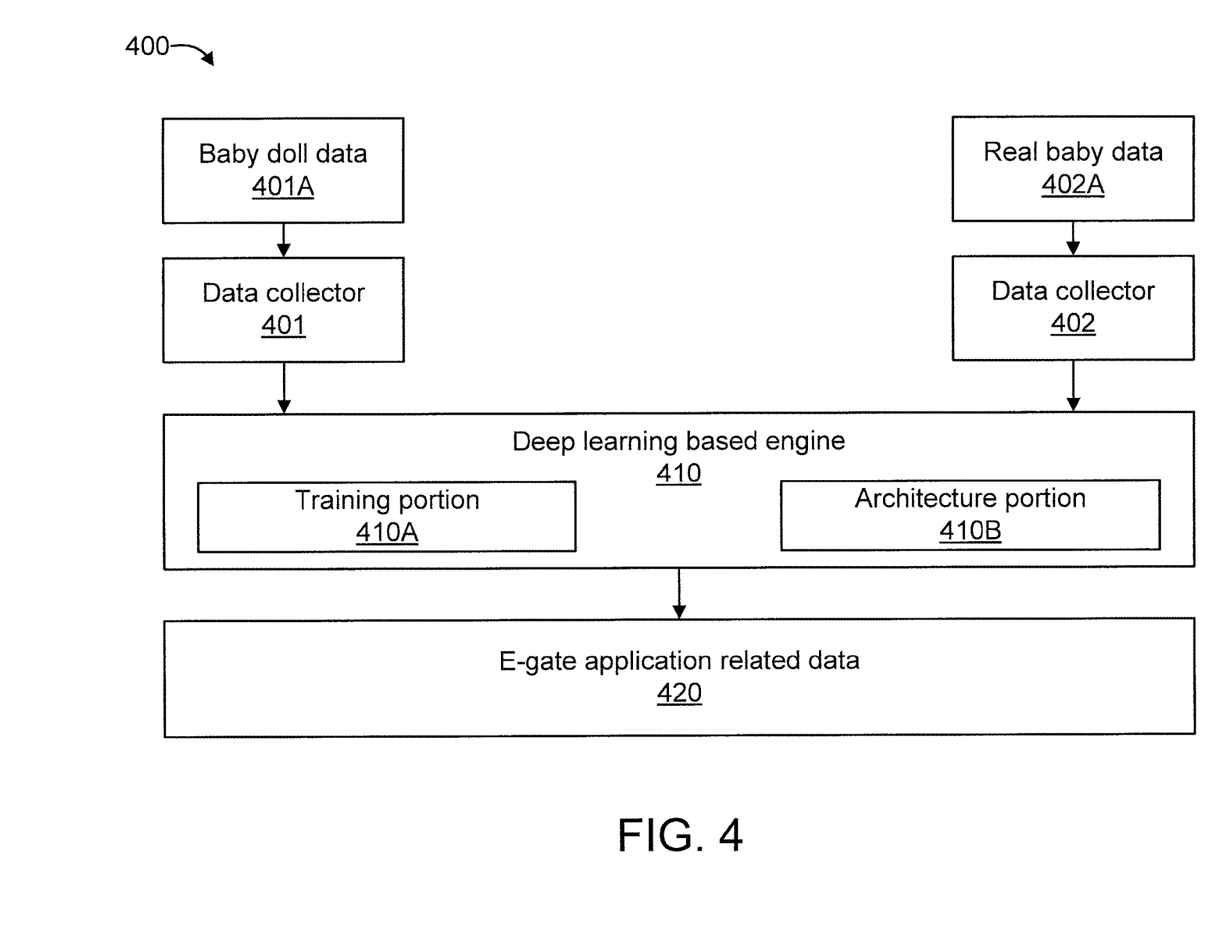
FIG. 4 shows the baby detection system of FIG. 2, in accordance with an embodiment of the present invention.

FIG. 4 shows the baby detection system 220 of FIG. 2, in accordance with an embodiment of the present invention.

The baby detection system 220 includes a data collector 401, a data collector 402, a deep learning engine 410, and e-gate application related data 420.

The data collector 401 is for collecting relating to baby dolls (interchangeably referred to herein as "baby doll data") 401A that is used as potential inputs to a face recognition system.

The data collector 402 is for collecting data relating to real babies (interchangeably referred to herein as "real baby data") 402A.

Regarding data collector 401, in recognition that baby dolls can be used as spoofing material for baby detection, data is collected regarding baby dolls. In an embodiment, a large variety of data samples, which are commonly used in various applications/scenarios, is collected. In an embodiment, the collected data is preferably provided by using multiple baby dolls having differing visual characteristics (differences in anatomical features, clothes, etc.) and held using different carrying types. For example, in an embodiment, the collected data involves baby dolls with different nationalities, different clothes, and different postures to collect diverse training data.

Further regarding data collector 401, data collection can be performed for different distractor modalities corresponding to different physical spoofing materials to prevent baby spoofing for the baby detection task.

Regarding data collector 402, a large variety of data samples, which are commonly used in various applications/scenarios, is collected. In an embodiment, the collected data is preferably provided by multiple real babies having differing visual characteristics (differences in anatomical features, nationality, clothes, etc.). For example, in an embodiment, the collected data involves babies with different nationalities, different clothes, and different postures to collect diverse training data. The data can be obtained, for example, from the Internet to avoiding overfitting to baby doll heads. Corresponding bounding boxes can be acquired by manually or automatically.

In an embodiment, the data collected by data collectors 401 and 402 is in picture/image form. Of course, other forms can also be used, while maintaining the spirit of the present invention. Moreover, other types of baby spoofing materials can be used, as readily appreciated by one of ordinary skill in the art given the teachings of the present invention provided herein, while maintaining the spirit of the present invention.

The deep learning engine 410 includes a training portion 410A and an architecture portion 410B. The deep learning engine 410 performs deep learning for baby detection.

Regarding the training portion 410A of the deep learning engine 410, in an embodiment, training is achieved by fine-tuning on top of a pre-trained model (e.g., AlexNet's Imagenet pre-trained model). In an embodiment, a multi-task learning process is used that jointly optimizes an object bounding task (e.g., a general object box allocation task) and a specific object detection model task (for baby head and other types of heads). The object bounding task involves assigning bounding boxes to potential objects of interest in an image. Such objects of interest can be babies in accordance with baby detection as disclosed herein. Hence, the object bounding task can be optimized for head detection in general or baby head detection in specific (and thus involving smaller sizes than expected for an adult head). The specific object detection model task detects the presence or absence of a baby with respect to an object of interest identified by the object bounding process using the deep learning model.

Of course, other training approaches can also be used, while maintaining the spirit of the present invention.

Figure 5:
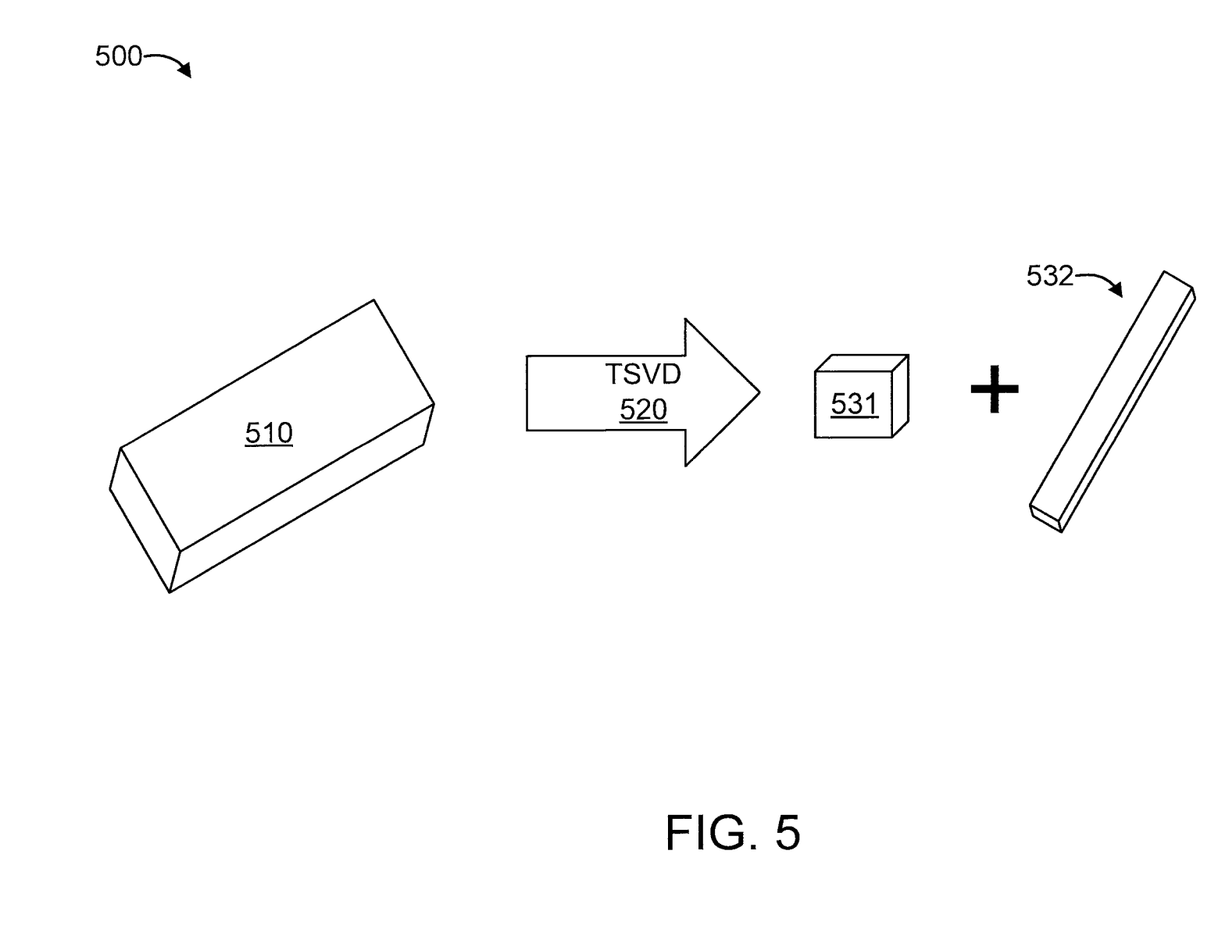
FIG. 5 shows an exemplary application of a TSVD algorithm to an original filter to obtain compressed filters, in accordance with an embodiment of the present invention.

Regarding the architecture portion 410B of the deep learning engine 410, in an embodiment, high efficiency with uncompromised accuracy is achieved by adopting a Singular Value Decomposition (SVD) algorithm (e.g., a truncated SVD (TSVD) algorithm) that reduces the number of filters in all layers of the deep learning object detection method. For example, original filters can be decomposed into two compressed filters that result in much fewer computations in all layers (less multiplication). FIG. 5 shows an exemplary application of a TSVD algorithm 520 to an original filter 510 to obtain compressed filters 511 and 512, in accordance with an embodiment of the present invention;

Further regarding the architecture portion 410B of the deep learning engine 410, in an embodiment, all layers of the neural network model including the convolutional layer are compressed. In an embodiment, an AlexNet-based Scale-Dependent Pooling (SDP) detector can be used as the basic model architecture. AlexNet is the name of a Convolutional Neural Network (CNN) running on Graphics Processing Units (GPUs) implemented in CUDA® for visual recognition. In an embodiment, the AlexNet Convolutional Neural Network includes 5 convolutional layers and 3 fully connected layers. Of course, other numbers of convolutional layer and/or fully connected layers can also be used, while maintaining the spirit of the present invention. Moreover, other detectors and architectures can also be used, given the teachings of the present invention provided herein, while maintaining the spirit of the present invention.

Figure 6:
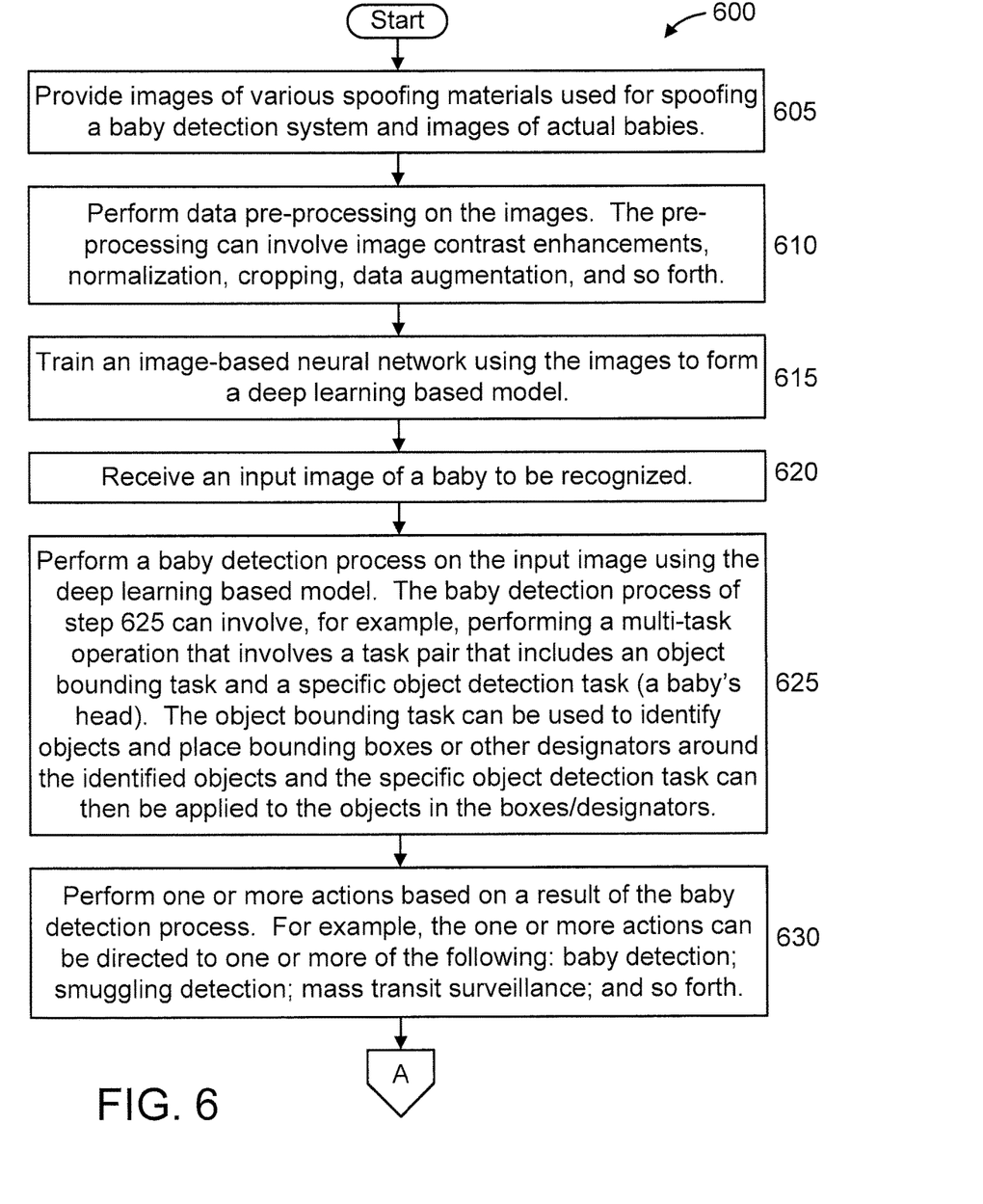
FIGS. 6-7 show an exemplary method for baby detection, in accordance with an embodiment of the present invention.
Figure 7:
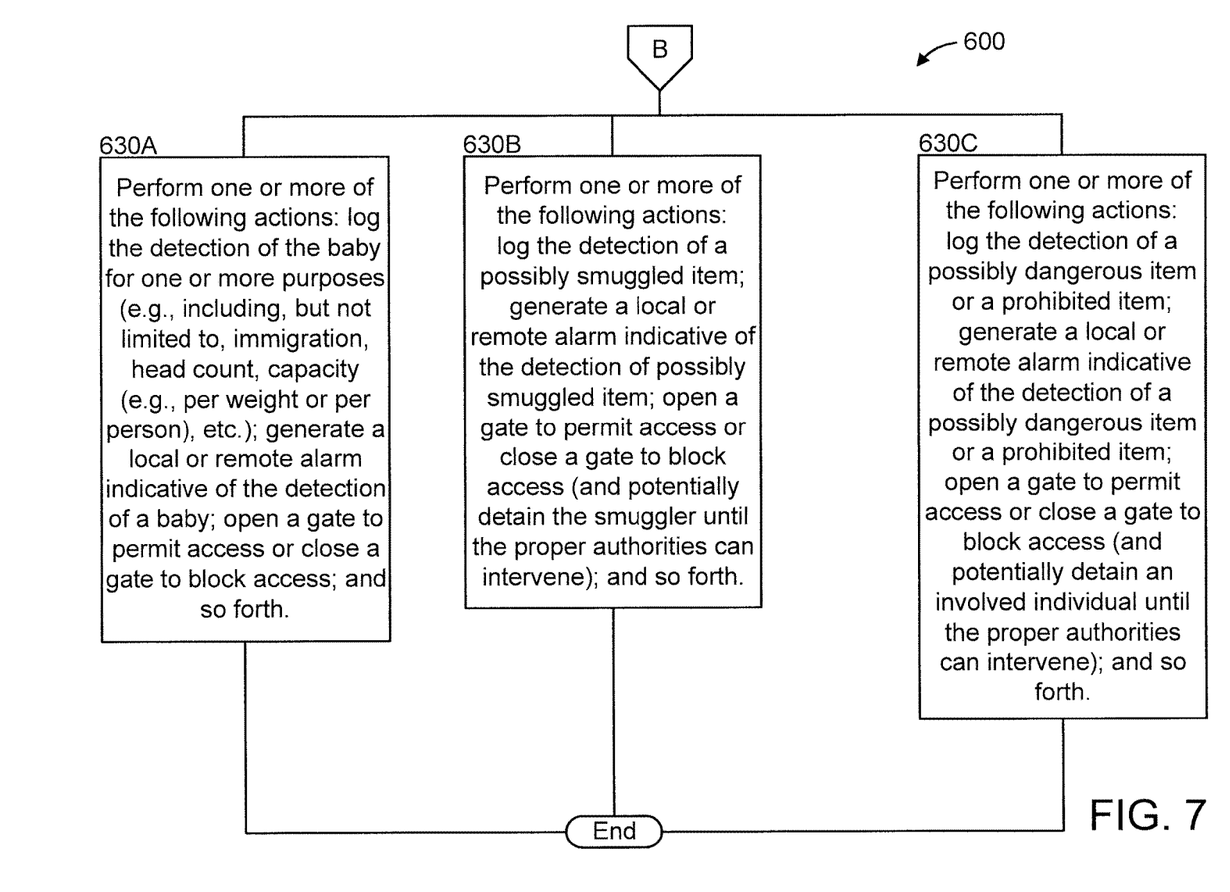

FIGS. 6-7 show an exemplary method 600 for baby detection, in accordance with an embodiment of the present invention. Steps 605 through 615 can be considered to correspond to a training stage 600A of method 600, while steps 620 through 625 can be considered to correspond to a recognition stage 600B of method 600, and step 630 can be considered to correspond to a post-recognition stage 600C.

At step 605, provide images of various spoofing materials used for spoofing a baby detection system and images of actual babies.

At step 610, perform data pre-processing on the images. The pre-processing can involve image contrast enhancements, normalization, cropping, data augmentation, and so forth.

At step 615, train an image-based neural network using the images to form a deep learning model. Preferably, the image-based neural network is trained using the images pre-processed by step 810. In an embodiment, the input images without pre-processing could be used or both the un-pre-processed and the pre-processed images could be used, depending upon the implementation. In an embodiment, the image-based deep learning model is trained based on an already formed neural network or can be created from scratch in this step, as readily appreciated by one of ordinary skill in the art given the teachings of the present invention provided herein, while maintaining the spirit of the present invention. As is evident to one of ordinary skill in the art, efficiency is enhanced when an already existing (object detection-based) neural network is used as a starting point, where such neural network can then be optimized to perform baby detection in accordance with the present invention.

At step 620, receive an input image of a baby to be recognized.

At step 625, perform a baby detection process on the input image using the deep learning model. In an embodiment, the baby detection process of step 625 can involve, for example, performing a multi-task operation that involves a task pair that includes an object bounding task and a specific object detection task (a baby's head). The object bounding task can be used to identify objects and place bounding boxes or other bounding designators (hereinafter "designators" in short) around the identified objects and the specific object detection task can then be applied to the objects in the boxes/designators to avoid having to process the whole image regarding the second (specific object detection) task. Step 625 can be performed for a specific application. Exemplary applications include, but are not limited to, the following applications: baby detection; smuggling detection; mass transit surveillance; and so forth.

At step 630, perform one or more actions based on a result of the baby detection process. For example, the one or more actions can be directed to one or more of the following: baby detection; smuggling detection; mass transit surveillance; and so forth.

In an embodiment, step 630 can include one or more of steps 630A through 630C.

At step 630A, corresponding to baby detection (e.g., with respect to an e-gate application), perform one or more actions than can include, but are not limited to, one or more of the following: log the detection of the baby for one or more purposes (e.g., including, but not limited to, immigration, head count, capacity (e.g., per weight or per person), etc.); generate a local or remote alarm indicative of the detection of a baby; open a gate to permit access or close a gate to block access; and so forth.

At step 630B, corresponding to smuggling detection, perform one or more actions than can include, but are not limited to, one or more of the following: log the detection of a possibly smuggled item (e.g., a baby, contraband (drugs, etc.) etc.); generate a local or remote alarm indicative of the detection of possibly smuggled item; open a gate to permit access or close a gate to block access (and potentially detain the smuggler until the proper authorities can intervene); and so forth.

At step 630C, corresponding to mass transit surveillance, perform one or more actions than can include, but are not limited to, one or more of the following: log the detection of a possibly dangerous item or a prohibited item; generate a local or remote alarm indicative of the detection of a possibly dangerous item or a prohibited item; open a gate to permit access or close a gate to block access (and potentially detain an involved individual until the proper authorities can intervene); and so forth.

As is evident to one of ordinary skill in the art, the action(s) taken is(are) dependent upon the type of application to which the present invention is applied.

Figure 8:
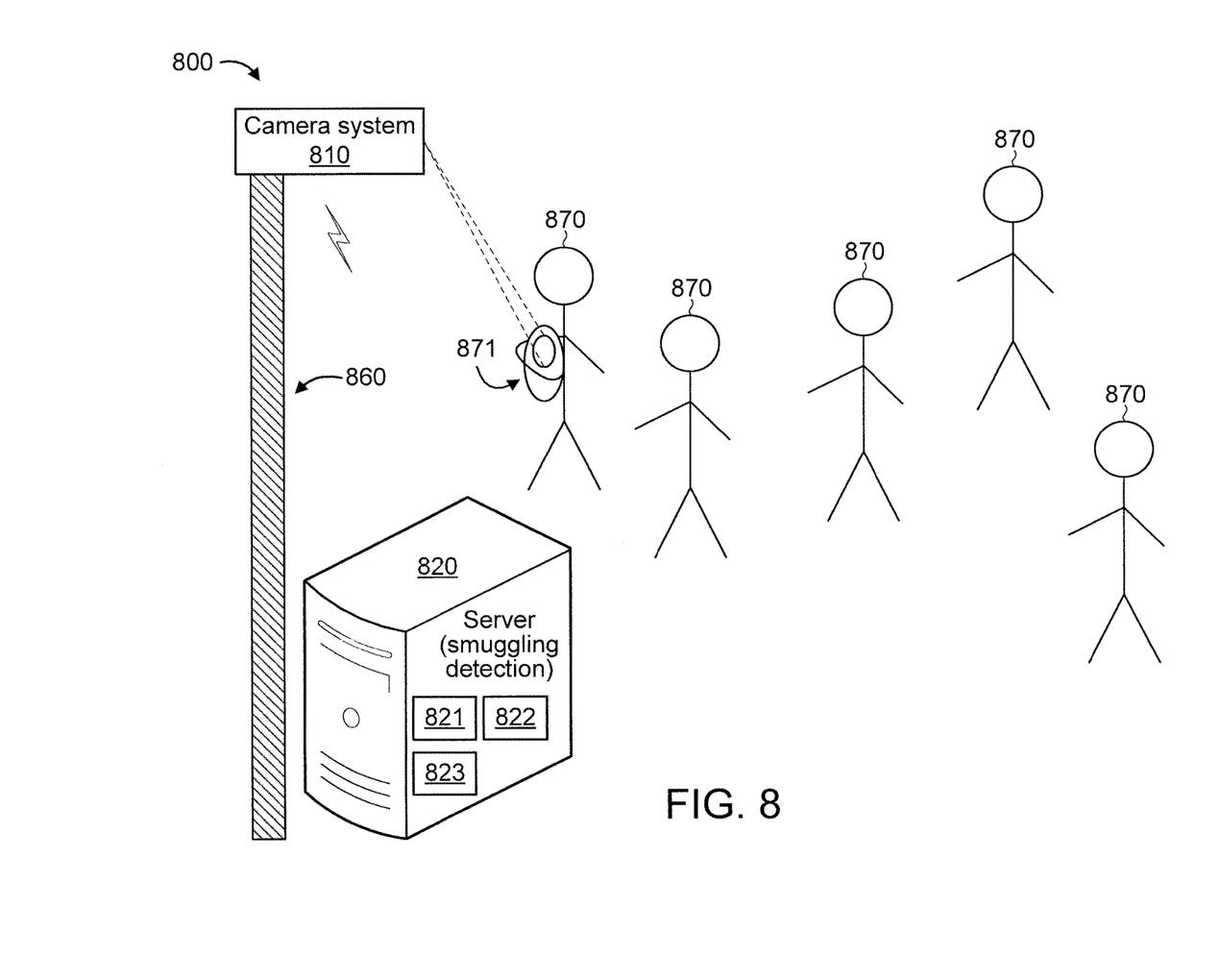
FIG. 8 shows an exemplary system for smuggling detection, in accordance with an embodiment of the present invention.

FIG. 8 shows an exemplary system 800 for smuggling detection, in accordance with an embodiment of the present invention.

The system 800 includes a camera system 810. While a single camera system 810 is shown in FIG. 8 for the sakes of illustration and brevity, it is to be appreciated that multiple camera systems can be also used, while maintaining the spirit of the present invention.

In the embodiment of FIG. 8, the camera system 810 is mounted on a mounting entity 860. For the sake of illustration, the mounting entity 860 is a pole 880. While a pole 860 is shown for the sake of illustration, any other mounting entity can be used, as readily appreciated by one of ordinary skill in the art given the teachings of the present invention provided herein, while maintaining the spirit of the present invention. For example, the camera system 810 can be mounted on a building, and so forth. The preceding examples are merely illustrative. It is to be appreciated that multiple mounting entities can be located at control hubs and sent to a particular location as needed.

The camera system 810 can be a wireless camera system or can use one or more antennas included on the pole 860 (or other mounting entity (e.g., building, drone, etc.) to which the camera system 810 is mounted or proximate).

The system 800 further includes a server 820 for smuggling detection that involves smuggling using a "fake" baby. The server 820 can located remote from, or proximate to, the camera system 810. The server 820 includes a processor 821, a memory 822, and a wireless transceiver 823. The processor 821 and the memory 822 of the remove server 820 are configured to perform smuggling detection based on images received from the camera system 810 by the (the wireless transceiver 823 of) the remote server 820. To that end, the processor 821 and memory 822 can be configured to include components of an image-based baby detection system. In this way, the presence of a baby 871, carried by a person 870, can be recognized as well as the presence of a non-baby being presented as a baby for a smuggling purpose.

Accordingly, some exemplary suitable environments to which the present invention can be applied can include any environments where smuggling detection can prove useful such as border crossings, transportation hubs, airports, ship ports, and so forth. It is to be appreciated that the preceding environments are merely illustrative and, thus, other environments can also be used, while maintaining the spirit of the present invention.

Figure 9:
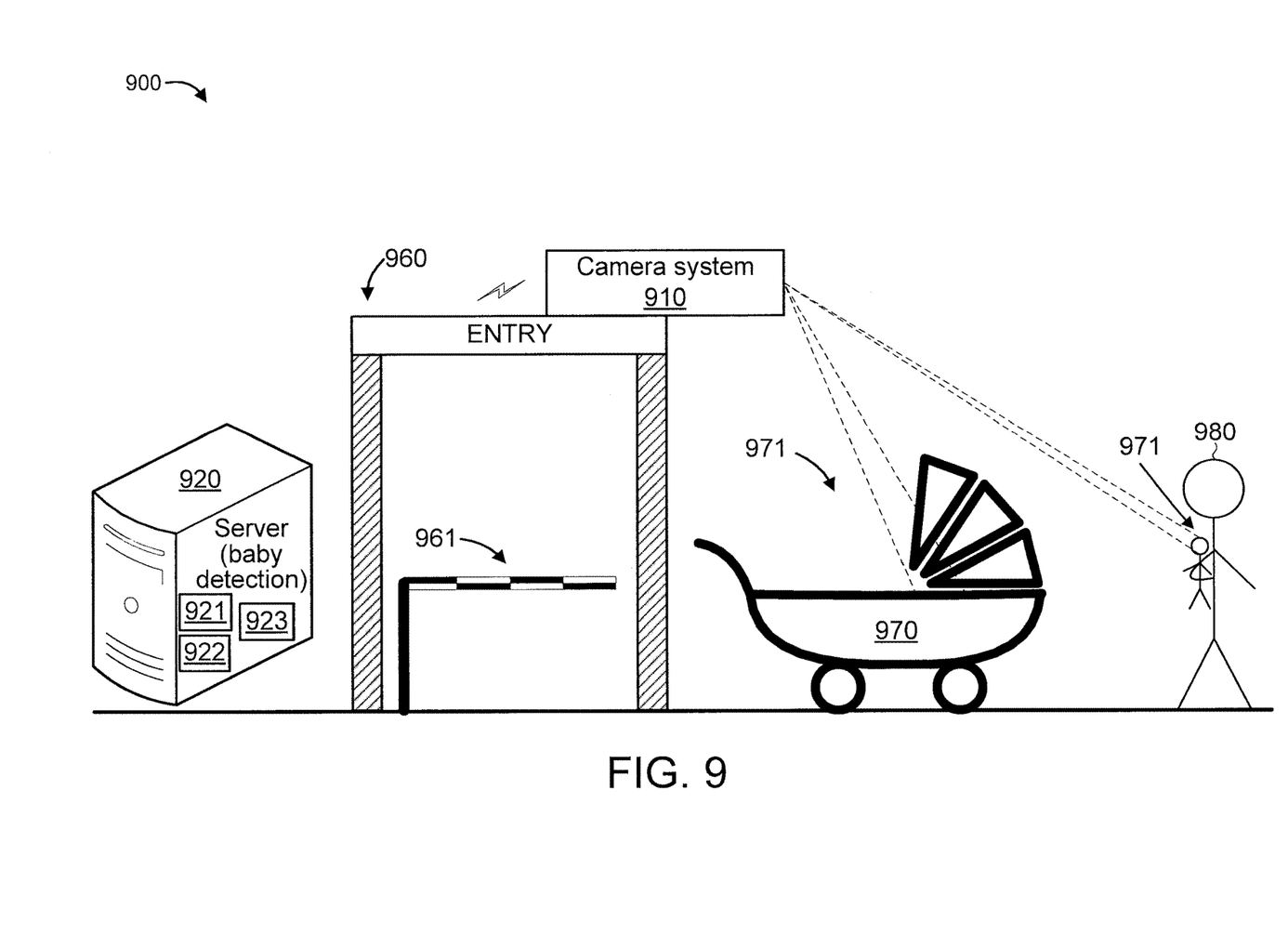
FIG. 9 shows an exemplary system for baby detection for electronic-gate (e-gate) environments, in accordance with an embodiment of the present invention.

FIG. 9 shows an exemplary system 900 for baby detection for electronic-gate (e-gate) environments, in accordance with an embodiment of the present invention.

The system 900 includes a camera system 910. While a single camera system 910 is shown in FIG. 9 for the sakes of illustration and brevity, it is to be appreciated that multiple camera systems can be also used, while maintaining the spirit of the present invention.

In the embodiment of FIG. 9, the camera system 910 is mounted on a mounting entity 960. For the sake of illustration, the mounting entity 960 is an arch structure 960 having a controlled gate 961. The gate 961 can be normally closed and then opened based on a recognition result regarding the person 970 attempting to gain access to the facility. While an arch structure 960 with a gate 961 is shown for the sake of illustration, any other mounting entity can be used, as readily appreciated by one of ordinary skill in the art given the teachings of the present invention provided herein, while maintaining the spirit of the present invention. For example, the camera system 110 can be mounted on a building, a pole, and so forth. The preceding examples are merely illustrative. It is to be appreciated that multiple mounting entities can be located at control hubs and sent to a particular location as needed.

The camera system 910 can be a wireless camera system or can use one or more antennas included on the arch structure 960 (or other mounting entity (e.g., building, drone, etc.) to which the camera system 910 is mounted or proximate).

The system 900 further includes a server 920 for baby detection, e.g., for e-gate environments. The server 920 can located remote from, or proximate to, the camera system 910. The server 920 includes a processor 921, a memory 922, and a wireless transceiver 923. The processor 921 and the memory 922 of the remove server 920 are configured to perform baby detection based on images received from the camera system 910 by the (the wireless transceiver 923 of) the remote server 920. To that end, the processor 921 and memory 922 can be configured to include components of an image-based baby detection system. In this way, the presence of a baby 971, e.g., in a baby carriage 970, can be recognized, as well as the presence of a baby 971, e.g., being carried by a person 980 (and thus, the baby 971 having their legs suspended in the air as shown in FIG. 9, a configuration that thwarts prior art approaches).

Accordingly, some exemplary suitable environments to which the present invention can be applied can include any e-gate environments where baby detection can prove useful such as border crossing, airports, ship ports, and so forth. It is to be appreciated that the preceding environments are merely illustrative and, thus, other environments can also be used, while maintaining the spirit of the present invention.

A description will now be given of some of the many attendant advantages of the present invention, in accordance with one or more embodiments of the present invention.

The present invention can be naturally applied to the e-gate system without any additional procedure or constraint such as, e.g., babies must be standing on the ground and walk by themselves as per prior art approaches.

The present invention can be applied to a system with a minimum hardware requirement, e.g. a single core processor and one or two cameras.

The present invention achieves very high accuracy and negligible false alarms, thus quality is higher than previous methods.

The present invention is fast and produces its output in approximately 0.3 seconds on a single-core i5 CPU.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A mass transit surveillance system, comprising:
   a camera configured to capture an input image of a subject purported to be a baby and presented at a mass transit environment;
   a memory storing a deep learning model configured to perform a baby detection task for the mass transit environment; and
   a processor configured to apply the deep learning model to the input image to provide a baby detection result of either a presence or an absence of an actual baby in relation to the subject purported to be the baby, and wherein the baby detection task is configured to evaluate one or more different distractor modalities corresponding to one or more different physical spoofing materials to prevent baby spoofing for the baby detection task.

2. The mass transit surveillance system of claim 1, wherein the processor applies the deep learning model to the input image in a multi-task learning process that jointly optimizes an object bounding task and the baby detection task.

3. The mass transit surveillance system of claim 1, wherein the deep learning model includes a training portion and an architecture portion, and wherein the architecture portion includes a Scale Dependent Pooling detector to enhance baby detection accuracy.

4. The mass transit surveillance system of claim 1, wherein the deep learning model includes a training portion and an architecture portion, and wherein the architecture portion is configured to apply a Singular Value Decomposition process that reduces a number of filters in at least some layers of the deep learning model.

5. The mass transit surveillance system of claim 4, wherein the Singular Value Decomposition Process is a Truncated Singular Value Decomposition process.

6. The mass transit surveillance system of claim 4, wherein all layers, including convolutional layers, of the deep learning model are compressed using the Singular Value Decomposition process.

7. The mass transit surveillance system of claim 1, wherein the processor is further configured to generate an alarm indicating the presence or the absence of the actual baby in relation to the subject purported to be the baby, responsive to a result of the baby detection task.

8. The mass transit surveillance system of claim 1, wherein the processor is further configured to log a detection of the absence of the actual baby and initiate a further investigation by an entity relating to the mass transit environment, responsive to a result of the baby detection task.

9. The mass transit surveillance system of claim 1, wherein the processor is further configured to selectively open a gate to permit access or close the gate to block access, responsive to a result of the baby detection task.

10. The mass transit surveillance system of claim 1, wherein the one or more different spoofing materials comprise images of baby dolls.

11. The mass transit surveillance system of claim 10, wherein the baby dolls in the images are depicted in various different positions.

12. The mass transit surveillance system of claim 1, wherein the processor is further configured to perform data preprocessing on the plurality of input images selected from the group consisting of image contrast enhancements, data augmentation, and cropping.

13. The mass transit surveillance system of claim 1, wherein the baby detection task is configured to detect the presence or the absence of the actual baby in a position where legs of the actual baby are off of the ground.

14. A computer-implemented method for mass transit surveillance, comprising:
   capturing, by a camera, an input image of a subject purported to be a baby and presented at a mass transit environment;
   storing, in a memory, a deep learning model configured to perform a baby detection task for the mass transit environment; and
   applying, by a processor, the deep learning model to the input image to provide a baby detection result of either a presence or an absence of an actual baby in relation to the subject purported to be the baby, and wherein the baby detection task is configured to evaluate one or more different distractor modalities corresponding to one or more different physical spoofing materials to prevent baby spoofing for the baby detection task.

15. The mass transit surveillance system of claim 14, wherein the processor applies the deep learning model to the input image in a multi-task learning process that jointly optimizes an object bounding task and the baby detection task.

16. The mass transit surveillance system of claim 14, wherein the deep learning model includes a training portion and an architecture portion, and wherein the architecture portion includes a Scale Dependent Pooling detector to enhance baby detection accuracy.

17. The mass transit surveillance system of claim 14, wherein the deep learning model includes a training portion and an architecture portion, and wherein the architecture portion is configured to apply a Singular Value Decomposition process that reduces a number of filters in at least some layers of the deep learning model.

18. The mass transit surveillance system of claim 17, wherein the Singular Value Decomposition Process is a Truncated Singular Value Decomposition process.

19. The mass transit surveillance system of claim 17, wherein all layers, including convolutional layers, of the deep learning model are compressed using the Singular Value Decomposition process.

20. A computer program product for mass transit surveillance, the computer program product comprising a non-transitory computer readable storage medium having program instructions embodied therewith, the program instructions executable by a computer to cause the computer to perform a method comprising:

capturing, by a camera, an input image of a subject purported to be a baby and presented at a mass transit environment;

storing, in a memory, a deep learning model configured to perform a baby detection task for the mass transit environment; and applying, by a processor, the deep learning model to the input image to provide a baby detection result of either a presence or an absence of an actual baby in relation to the subject purported to be the baby, and wherein the baby detection task is configured to evaluate one or more different distractor modalities corresponding to one or more different physical spoofing materials to prevent baby spoofing for the baby detection task.

* * * * *